United States Patent [19]

Kageyama et al.

[11] Patent Number: 4,855,833

[45] Date of Patent: Aug. 8, 1989

[54] TELEVISION CHANNEL SELECTION APPARATUS EMPLOYING MULTI-PICTURE DISPLAY

[75] Inventors: Yoshikazu Kageyama; Mineo Mino, both of Osaka, Japan

[73] Assignee: Matsushita Electric Industrial Co., Ltd., Japan

[21] Appl. No.: 116,735

[22] Filed: Nov. 4, 1987

[30] Foreign Application Priority Data

Nov. 4, 1986 [JP] Japan .................... 61-262230

[51] Int. Cl.⁴ .................... H04N 5/268; H04N 5/272; H04N 5/44
[52] U.S. Cl. .................... 358/183; 358/181; 358/191.1
[58] Field of Search ............ 358/183, 181, 182, 191.1, 358/22

[56] References Cited

U.S. PATENT DOCUMENTS

| | | | |
|---|---|---|---|
| 4,238,773 | 12/1980 | Tsuboka et al. | 358/183 |
| 4,249,211 | 2/1981 | Baba et al. | 358/183 |
| 4,249,213 | 2/1981 | Imaide et al. | 358/183 |
| 4,259,690 | 3/1981 | Nakamishi et al. | 358/183 |
| 4,266,242 | 5/1981 | McCoy | 358/22 |
| 4,360,831 | 11/1982 | Kellar | 358/183 |
| 4,636,864 | 1/1987 | Annegarn et al. | 358/191.1 |
| 4,680,643 | 7/1987 | Horiguchi | 358/183 |
| 4,729,028 | 3/1988 | Micic et al. | 358/183 |
| 4,774,582 | 9/1988 | Hakamada et al. | 358/183 |
| 4,777,531 | 10/1988 | Hakamada et al. | 358/183 |

FOREIGN PATENT DOCUMENTS 0051172  5/1981  Japan .................... 358/183

Primary Examiner—James J. Groody
Assistant Examiner—John K. Peng
Attorney, Agent, or Firm—Lowe, Price, LeBlanc, Becker & Shur

[57] ABSTRACT

An apparatus for selecting one of a number of television channels is operable to be set in a mode whereby an array of miniature pictures corresponding to the respective channels is displayed, with each channel being sequentially selected for a predetermined interval during which image data for the selected channel are repetitively written into one of a set of regions (42 to 50) of a one-field memory, with the entire memory contents being continuously and repetitively read out, whereby the picture for the selected channel appears as a moving picture while those of the other channels are static. The apparatus can then be set in a normal operating mode, with the channel selected at the time of mode changeover being thereafter held fixedly selected and a normal display picture produced.

3 Claims, 5 Drawing Sheets

TELEVISION CHANNEL SELECTION APPARATUS EMPLOYING MULTI-PICTURE DISPLAY

BACKGROUND OF THE INVENTION

The present invention relates to a channel selection apparatus for use in video equipment such as a television receiver or VTR which receives television broadcast signals, with television channel selection being performed based upon a multi-picture display of an array of miniature pictures for the respective channels.

In the prior art, a user generally performs television channel selection by first searching in a program list (e.g. published in a newspaper) to find a channel in which a desired program appears, and then setting the television receiver or VTR to the appropriate channel. Alternatively, the user may simply perform successive actuations of a channel selection switch, to display pictures for each of the channels and so find a desired program. However it is desirable to provide a channel selection function whereby the user can rapidly and conveniently find a desired program, and immediately select the corresponding television channel. It is an objective of the present invention to provide an apparatus which implements such an improved channel selection function.

SUMMARY OF THE INVENTION

In order to attain the objective set out above, the present invention provides a multi-picture display channel selection apparatus for use in equipment such as a television receiver or VTR, whereby a multi-picture display operating status can be established in which an array of miniature pictures corresponding to the respective television channels is displayed on the screen of the television receiver (or, in the case of a VTR, the screen of a television receiver or video display unit which is coupled to receive a video signal from that VTR). The apparatus acts to sequentially select each of the television channels for a predetermined short time interval, during which the miniature display picture for the selected channel appears as a moving picture, while the miniature display pictures for the remaining channels appear as static images, In this way, the user is provided with display information for all of the television channels simultaneously, while in addition the channel which is currently being selected by the apparatus is clearly indicated, by a corresponding moving picture which appears within an array of static images. When the user has decided upon a specific channel, then it is only necessary to execute changeover of the apparatus operation from the multi-picture display mode to the normal display mode, at a point in time when the miniature display picture for the desired channel is displayed as a moving picture.

In order to provide the functions described above, a multi-picture display channel selection apparatus according to the present invention includes a memory which is capable of storing the complete field of a video signal, together with means for executing write-in of video data to a set of addresses of the memory concurrently with read-out of video data (to be displayed) from addresses which are different from the write-in addresses.

Data representing a miniature display picture for each of the channels are sequentially stored in predetermined regions of the memory, by being repetitively written-in during a plurality of successive field intervals extending over a specific time interval (e.g. one or two seconds). During such a write-in operation, read-out operations are continuously executed for all of the memory addresses, so that video data for miniature display pictures of all of the channels for which data have been stored in the memory are continuously read out and are displayed. As a result, due to the consecutive write-in operations performed for the currently selected channel during a plurality of successive field intervals, the video data corresponding to the currently selected channel which are read out from the memory and applied to the display will result in a moving picture being produced, while the video data corresponding to the other channels which are read out from the memory will result in respective static (miniature) pictures being produced.

More specifically the present invention comprises a channel selection apparatus manually operable for selecting one of a plurality of television channel signals, to derive a video signal to be supplied to television picture display means, the apparatus comprising:

television signal receiving circuit means coupled to receive said plurality of television channel signals, for selecting and demodulating one of said channel signals to produce a first video signal;

memory means capable of storing data representing at least one field of said first video signal and;

control circuit means for controlling receiving circuit means and said memory means, operable to selectively establish a normal operating mode of said apparatus in which one of said channel signals is fixedly selected by said television signal receiving circuit means and said first video signal is directly transferred to said display means to thereby display a corresponding television picture, and a multi-picture display operating mode in which data stored in said memory means are continuously read out and converted to a second video signal which is transferred to said display means, to display a corresponding television picture;

and is characterized in that during operation in said multi-picture display mode, said plurality of television channel signals are sequentially selected by said receiving circuit means during respective time intervals of fixed duration, and in that during each of said time intervals, data derived from said first video signal, representing a television picture in compressed form, are repetitively written into said memory means during a plurality of successive fields of said first video signal, said data being written concurrently with said continuous read-out operation, whereby a miniature display picture corresponding to a currently selected one of said channels is displayed by said display means in the form of a moving picture, while miniature display pictures corresponding to the remainder of said channels are displayed in the form of respective static pictures.

DESCRIPTION OF THE PREFERRED EMBODIMENTS

Figure 1:
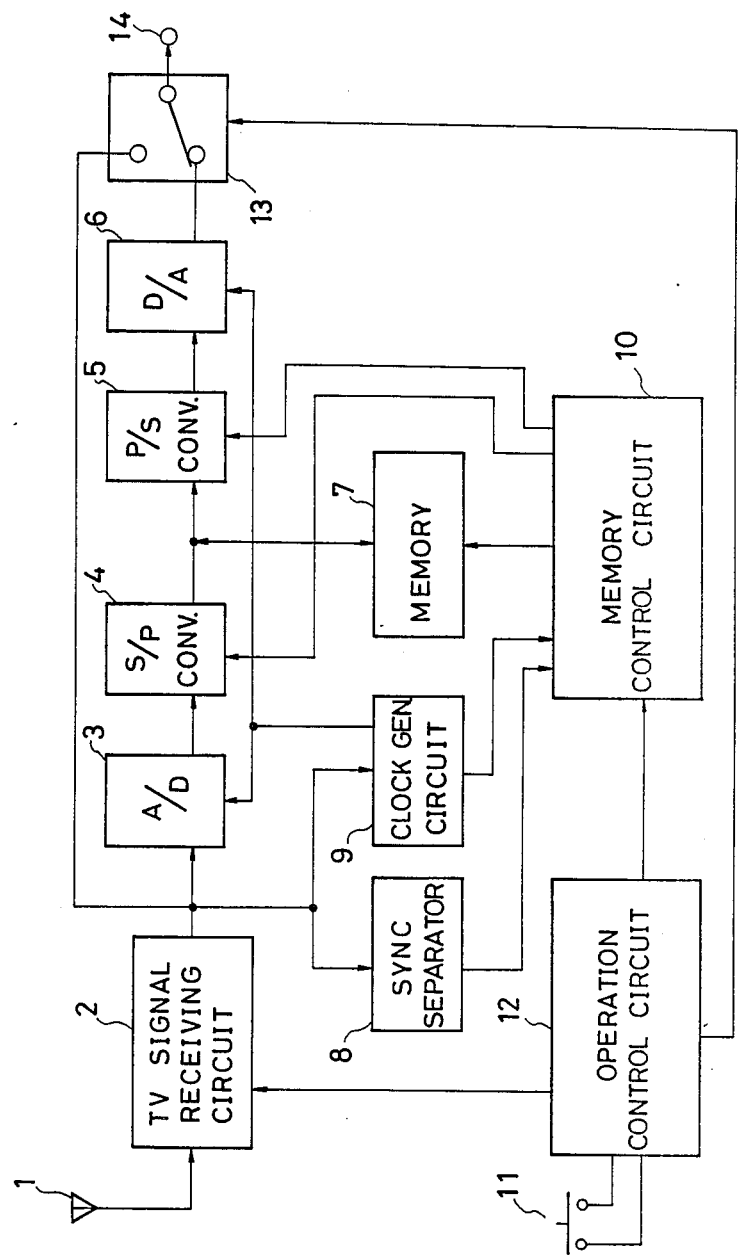
FIG. 1 is a general block diagram showing the basic configuration of an embodiment of a multi-picture display channel selection apparatus according to the present invention.

FIG. 1 is a general block diagram showing the basic configuration of an embodiment of a multi-picture display channel selection apparatus according to the present invention. In FIG. 1, numeral 1 denotes an antenna for receiving broadcast television waves, numeral 2 denotes a television signal receiving circuit for receiving signals from the antenna 1 and selectively demodulating one of a plurality of television channel signals contained in the antenna signals to produce a video signal as an output signal. Numeral 3 denotes an A/D (analog-to-digital) converter for converting the video signal produced from the television signal receiving circuit 2 to digital form, by executing periodic sampling and conversion operations. The digital data samples which are thus sequentially produced are supplied to a S/P (serial-to-parallel) converter 4, which periodically converts successive sets of data from the A/D converter 3 into parallel form, to be written into a memory 7 having sufficient capacity to store one field of a video signal in digital form. The memory 7 can for example consist of a DRAM (dynamic random access memory). Numeral 5 denotes a parallel/serial converter for converting successive sets of data, read out periodically from the sync separator circuit 8, from parallel to serial form, to be supplied to a D/A (digital-to-analog) converter 6. Successive sets of digital data which are thereby produced from the P/S converter 5 are thereby converted by the D/A converter 6 into an analog video signal, which is supplied to one input terminal of a changeover switch 13, while the video output signal from the television signal receiving circuit 2 is applied to a second input terminal of the changeover switch 13. The switch 13 functions to select one of these video signals to be transferred to an output terminal 14, and hence to be supplied to display circuits and a display device having a display screen (not shown in the drawings) to produce a television picture display. Numeral 8 denotes a sync separator circuit for extracting horizontal and vertical sync signal components of the video signal produced from the television signal receiving circuit 2. Numeral 9 denotes a clock signal generating circuit for producing a clock signal which is synchronized with the sync components of the video signal from the television signal receiving circuit 2. Numeral 10 denotes a memory control circuit for controlling read and write operations of the memory 7, at timings controlled by output signals from the sync separator circuit 8 and the clock signal generating circuit 9. Numeral 11 denotes an operating switch which is coupled to an operation control circuit 12 and is actuatable to cause the operation control circuit 12 to establish either a multi-picture display mode of operation, in which a multi-picture display is produced on the screen of the display device as described hereinafter, or a normal mode of operation in which only a single picture (for a television channel selected by the television signal receiving circuit 2) appears on the display. Specifically, command signals from the operation control circuit 12 are supplied to the memory control circuit 10, to determine the form of control applied to the memory 7 during multi-picture display operation, while in addition other command signals are applied from the operation control circuit 12 to the television signal receiving circuit 2 for executing sequential selection of each television channel for a predetermined duration, during multi-picture display operation. In addition, a command signal from the operation control circuit 12 controls selection of a video signal by the changeover switch 13, to be transferred to the output terminal 14. The operation control circuit 12 is preferably implemented as a microcomputer which operates in accordance with a predetermined program.

Figure 2:
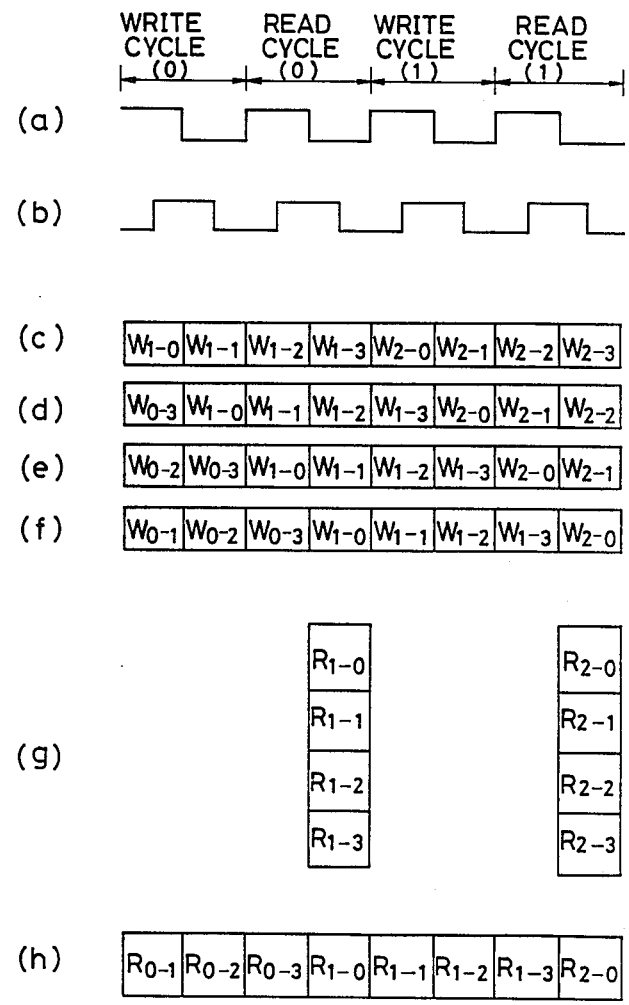
FIGS. 2(a) to 2(h) are diagrams for assistance in describing concurrent read/write operations which are executed by a 1-field memory in the embodiment of FIG. 1.

FIGS. 2(a) to 2(h) are diagrams for assistance in describing concurrent read/write operations which are executed by the memory 7 in conjunction with the S/P converter 4 and the P/S converter 5, under the control of the memory control circuit 10. During multi-picture display operation, the memory 7 continuously executes read-out operations from successive memory addresses, i.e. from an initial address to a final address, again from the initial to the final address, and so on. These read-out operations are performed during periodically repeated intervals, referred to in the following as read cycles. When data are to be written into the memory 7, write operations are performed during periodically repeated intervals, referred to in the following as write cycles, which alternate with the read cycles. Read and write operations are mutually independent, and can be executed concurrently for respectively different sets of successive memory addresses. The read and write operations, as well as memory address generation, are executed under the control of signals produced from the memory control circuit 10 at timings determined by the clock signal which is produced from the clock signal generating circuit 9 (referred to in the following as the reference clock signal). The control signals produced for the above purposes by the memory control circuit 10 and applied to the memory 7 include a CAS (column address strobe signal), a RAS (row address strobe signal), a WE (write enable) signal, and an OE (output enable). FIGS. 2(a) and 2(b) show the respective waveforms of the RAS and the CAS during four successive read and write cycles. The WE and OE signals are omitted from FIG. 2.

The A/D converter 3 performs periodic sampling operations on the video signal produced from the television signal receiving circuit 2. Each of these sampling operations results in a corresponding set of digital data (e.g. 6 bits) being produced. Such sets of data will be referred to in the following as digital samples, When four successive digital samples have been transferred to the S/P converter 4 from the A/D converter 3, the S/P converter 4 transfers these four digital samples, in parallel, to the memory 7 during a write cycle. The digital data are thereby written, in parallel, into a specific address of the memory 7. The S/P converter 4 can readily be configured as a shift register circuit, i.e. having four sets of stages connected in series to accommodate a total of four digital samples, and with latch circuits coupled to the outputs from the shift register stages. Since such an arrangement is very well known in the art, no specific circuit arrangement will be described herein. These shift operations are executed in synchronism with a clock signal produced from the clock signal generating circuit 9, i.e. in synchronism with the reference clock signal described above. This serial/parallel transfer operation is illustrated in FIGS. 2(c) to (f), which show the respective outputs produced from the four sets of shift register stages (with FIG. 2(c) showing the output from the initial, i.e. input stage, and FIG. 2(f) the output from the final stage). Initially, it is assumed that the shift register stages contain respective digital samples designated as $W_{0\ 1}$ to $W_{1-0}$, and that the succession of digital samples shown in FIG. 2(c) are thereafter supplied by successive sampling operations of the A/D converter 3. A total of four shift operations (synchronized of course with the sampling operations) take place during each period between successive read cycles (or write cycles). Thus, during the write cycle (1) shown in FIG. 2, the outputs from the shift register stages of S/P converter 4 attain the condition $W_{1-0}$, $W_{1-1}$, $W_{1-2}$, $W_{1-3}$. These digital sample values are held in the latch circuits of the S/P converter 4, and are then written in, in parallel to a memory address of the memory 7 which is specified by the memory control circuit 10. After another four successive shift operations (with corresponding data sampling operations) have taken place, another write-in operations is executed, during write cycle (2).

The P/S converter 5 can have a similar configuration to the S/P converter 4, i.e. a set of four sets of shift register stages connected in series, to accommodate four digital data samples, but with latch circuits being connected between the read outputs of the memory 7 and the respective inputs of the shift register stages, for temporary storage of data which are read out. Memory read-out is performed as follows, referring to FIGS. 2(g) and (h). During each read cycle, a memory address for data read-out is supplied from the memory control circuit 10 to the memory 7. Thus for example when the memory address of the four digital data samples $W_{1-0}$ to $W_{1-3}$ (after write-in of these data as described above) is supplied to the memory 7 during a read cycle, then these data are read out, in parallel, from the memory 7. The data thus read out are indicated as $R_{1-0}$ to $R_{1-3}$ in FIG. 2(g). These data are then held temporarily in the latch circuits of the P/S converter 5, and are then successively shifted out of the P/S converter 5 in synchronism with the same shift clock signal which is applied to the S/P converter 4. After four of such shift operations, another address is supplied to the memory 7 from the memory control circuit 10 during a read cycle (e.g. read cycle (2) in FIG. 2), and another set of digital data samples are transferred in parallel to the P/S converter 5 and sequentially transferred sequentially out of the P/S converter 5 to the D/A converter 6. In this way, successive digital data samples are successively supplied to the D/A converter 6 in the same sequence in which these digital samples were previously generated by the A/D converter 3, (e.g. in the sequence $r_{0-1}$ to $R_{2-0}$ shown in FIG. 2(h)), and are successively converted into analog data values In this way, a continuous analog video signal is produced from the D/A converter 6, in spite of the fact that read and write operations of the memory 7 take place in a sequentially alternating manner as described above.

It will be apparent from the above that with the described embodiment, video data can be written into successive memory addresses concurrently with readout of data from a different set of addresses from those into which data are being written.

Figure 3:
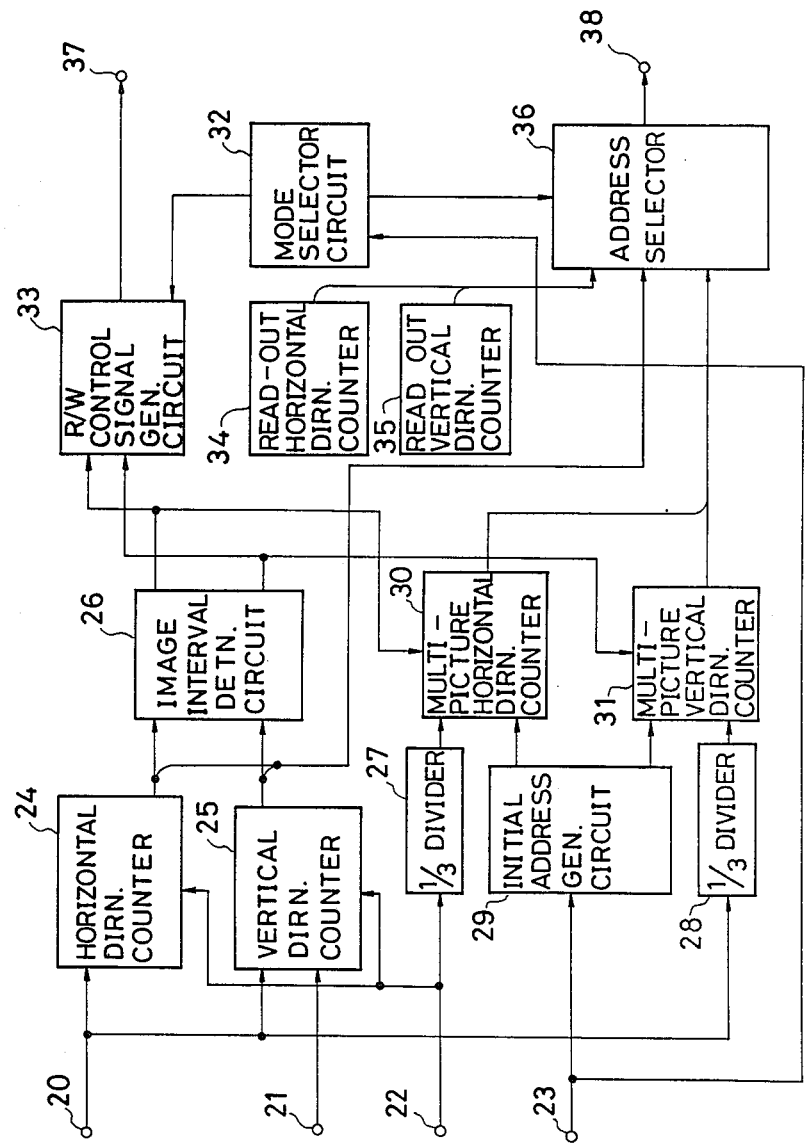
FIG. 3 is a general block diagram showing the basic configuration of a memory control circuit in the embodiment of FIG 1.

The embodiment will be described in the following for the case of a multi-picture display being produced which consists of an array of nine miniature display pictures. FIG. 3 is a general block diagram showing the arrangement of the main components of the memory control circuit 10. In FIG. 3 numeral 20 denotes an input terminal to which is applied a horizontal sync signal that is supplied from the sync separator circuit 8 shown in FIG. 1. Numeral 21 denotes an input terminal to which is applied a vertical sync signal, also supplied from the sync separator circuit 8, and numeral 22 denotes an input terminal coupled to receive the reference clock signal produced from the clock signal generating circuit 9 and described hereinabove. Numeral 23 collectively designates a set of input terminals which receive command signals from the operation control circuit 12. Numeral 24 denotes a horizontal direction counter which counts successive pulses of the reference clock signal from input terminal 22 and is periodically reset by horizontal sync signal pulses. Numeral 25 denotes a vertical direction counter, which counts successive horizontal sync signal pulses and is periodically reset by vertical sync signal pulses. Numeral 26 denotes an image interval detection circuit, which functions to detect the occurrence of successive portions of the video signal supplied from the television signal receiving circuit 2 that contain only image data (i.e. portions of the video signal from which all vertical and horizontal blanking intervals are excluded), and to generate control signals for the duration of each of such image data portions of the video signal. This detection function of the image interval detection circuit 26 is based upon respective count values attained by the horizontal direction counter 24 and vertical direction counter 25. Numeral 27 denotes a ⅓ frequency divider circuit which performs frequency division of the reference clock signal from input terminal 22 to produce a frequency-divided clock signal having a period which is three times that of the reference clock signal, and is supplied to a counter 30 to be counted thereby. Numeral 29 denotes a multi-picture display starting address generating circuit, which establishes initial values for the counters 30 and 31 as designated by command signals from the operation control circuit 12, supplied via the input terminals 23. Numeral 28 denotes a ⅓ frequency divider for dividing the horizontal sync signal from input terminal 20, to produce a clock signal having a period which is three times that of the horizontal sync signal pulses, and which is supplied to the counter 31 to be counted thereby. The counter 30 is a multi-picture display horizontal direction counter, while counter 31 is a multi-picture display vertical direction counter. These counters 30 and 31 are utilized in generating addresses for write-in of data to the memory 7 during multi-picture display operation, as described hereinafter. Numeral 32 denotes a mode selection circuit, which produces control signals to control internal operating modes in accordance with commands from the operation control circuit 12. Numeral 33 denotes a read/write control signal generating circuit, which produces control signals that are applied (from a set of output terminals which are collectively designated by numeral 37) to the memory 7, the S/P converter 4 and the P/S converter 5 for controlling the memory read and write operations described hereinabove. Numeral 34 denotes a read-out horizontal direction counter, and 35 a read-out vertical direction counter, whose respective count values determine memory addresses from which data are read out during multi-picture display operation. That is to say, each address in the memory 7 is defined as a combination of a row (horizontal) address and a column (vertical) address. The clock signal and reset signal applied to the read-out horizontal direction counter 34 are respectively identical to those of the horizontal direction counter 24, while the clock signal and reset signal applied to the read-out vertical direction counter 35 are respectively identical to those of the vertical direction counter 25, described hereinabove. However to simplify the drawing, the corresponding connecting lines are omitted. Numeral 36 denotes an address selector circuit, which is controlled by control signals supplied from the mode selection circuit 32 to selecting either the count values of the pair of counters 34, 35, the count values of the pair of counters 30, 31, or the count values of the pair of counters 24, 25, to be supplied as address information to the memory 7 in the form of signals which are transferred from set of terminals collectively designated by numeral 38.

As stated hereinabove, continuous read-out operations are executed by the memory 7 during multi-picture display operation, and the addresses from which data are read out during successive read cycles of the memory 7 are determined by the count values of the read-out horizontal and vertical direction counters 34 and 35, i.e. these count values are selected by the address selector circuit 36 during each read cycle. During an initial write-in stage of operation which is executed immediately after initiation of the multi-picture display mode (as described in detail hereinafter), an entire field of video data, including horizontal and vertical blanking intervals and sync pulses, is written into the memory 7. During that process, the count values of the horizontal direction counter 24 and vertical direction counter 25 are selected by the address selector circuit 36 during each write cycle, as a memory address into which data are written. Upon completion of that initial stage of operation, whenever it is detected by the image interval detection circuit 26 that an image data portion of the video signal is occurring, the address selector circuit 36 selects the count values of the multi-picture display horizontal and vertical direction counters 30 and 31 during each write cycle of the memory 7, as a memory address into which data are written.

Figure 4:
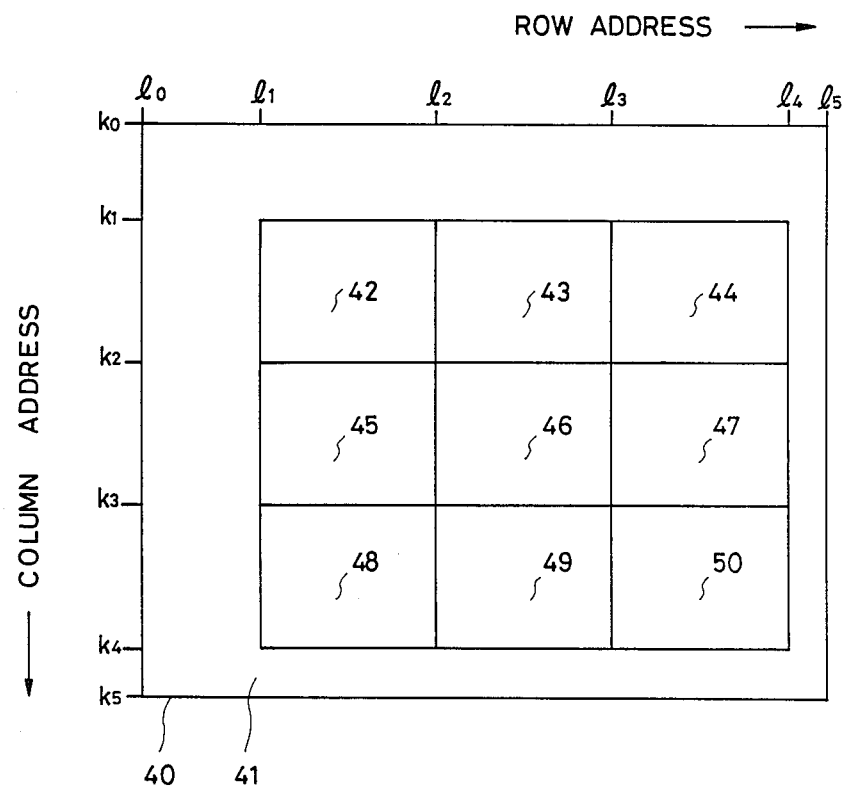
FIG. 4 is a conceptual diagram showing an address map of a 1-field memory in the embodiment of FIG. 1.

FIG. 4 shows an address map of the memory 7, in which row addresses successively appear along the horizontal direction and column addresses successively appear along the vertical direction. Numeral 40 denotes the overall memory region, which is capable of storing one complete field of the video signal, numeral 41 denotes a memory region referred to in the following as the blanking interval region, in which is stored horizontal and vertical blanking interval data, and numerals 42 to 50 respectively denote memory regions in which are stored image data representing respective ones of the array of 9 miniature display pictures which are produced on the display screen by this embodiment, as stated hereinabove, During read-out operation, the row address (corresponding to the count value of the read-out horizontal direction counter 34) is successively incremented in synchronism with the reference clock signal which is applied to input terminal 22 described above, and is reset to an initial value designated as $l_0$ each time that a horizontal sync signal pulse of the video signal from horizontal direction counter 24 occurs. The column address (corresponding to the count value of the read-out vertical direction counter 35) is incremented by one in response to each horizontal sync signal pulse, and is reset to an initial value designated as $k_0$ each time that a vertical sync signal pulse occurs.

The process of generating a multi-picture display will be described in greater detail referring to FIGS. 3 and 4. When the multi-picture display mode is initiated by operation control circuit 12, in response to an actuation of the operating switch 11, the next vertical sync signal pulse to occur acts to preset the vertical direction counter 25 to a count value corresponding to the initial column address $k_0$, while the next horizontal sync signal pulse serves to preset the horizontal direction counter 24 to an initial value corresponding to the initial row address $l_0$. In addition, a control signal applied from the operation control circuit 12 causes the mode selection circuit 32 to set the address selector circuit 36 in an operating condition whereby (during each write cycle) the count values of the horizontal direction counter 24 and vertical direction counter 25 are transferred as row and column addresses respectively to the memory 7. Thereafter, successive pulses of the reference clock signal are counted by the horizontal direction counter 24 during one horizontal scanning interval, with successive row addresses being thereby successively generated, until the row address $l_5$ is reached. At each row address, a set of digital data samples are written (in parallel, as described above) from the S/P converter 4 into the memory 7. A horizontal sync signal pulse then occurs, whereby the horizontal direction counter 24 is again preset to a count corresponding to $l_0$, while the vertical direction counter 25 is incremented by one, to thereby increment the column address accordingly and data are thereafter written into the next set of addresses. When the final row address $l_5$ of the final column address $k_5$ is reached, a command from the operation control circuit 12 causes the mode selection circuit 32 to terminate transfer of the count values of the horizontal direction counter 24 and vertical direction counter 25 as addresses to the memory 7, and commands the read-/write control signal generating circuit 33 to terminate write-in operations. At this point, one complete field of the video signal from the television signal receiving circuit 2, including data representing all of the horizontal and vertical blanking intervals of that field, has been written into the memory 7. The blanking interval region 41 now contains this blanking interval data, while the set of memory regions 42 to 50 contain, in combination, data representing a single continuous display image. The purpose of this initial write-in stage of operation is solely to store the blanking interval data in memory region 41, and it is preferable that the image data stored in regions 42 to 50 be replaced at some stage in the above operation by data representing the video black level. This will ensure that the display screen is made uniformly black when multi-picture display operation is initiated, to thereby facilitate viewing of the subsequently generated miniature display pictures.

Generation of a multi-picture display is now initiated. During each read cycle of the memory 7, a command from the operation control circuit 12 causes the mode selection circuit 32 to control the address selector circuit 36 such that the count values of the read-out horizontal and vertical direction counters 34 and 35 are applied as address data for the memory 7, and to control the R/W control signal generating circuit 33 to produce control signals whereby a read-out operation by the memory 7 and P/S converter 5 is performed in every read cycle. This data read-out operation is executed continuously during operation in the multi-picture display mode to produce an output video signal from the D/A converter 6, so that the data contents of the memory regions 42 to 50 appear on the display, with horizontal and vertical sync signals for display operation being produced from data read out from the blanking interval region 41. It will be assumed that image data for a miniature display picture are first written into the memory region 42. Firstly, a command from the operation control circuit 12 causes the television signal receiving circuit 2 to select one of the television channels ( e.g. which has been predetermined as corresponding to the memory region 42) to be produced as the output video signal from the television signal receiving circuit 2. In addition, the row address $l_1$ and column address $k_1$ of the memory region 42 are respectively supplied from the multi-picture display starting address generating circuit 29 in response to a command from the operation control circuit 12, to be set as initial count values of the multi-picture display horizontal and vertical direction counters 30 and 31 respectively. At this point, counting operation by the multi-picture display horizontal and vertical direction counters 30 and 31 is being inhibited by control signals applied from the image interval detection circuit 26. When the image interval detection circuit 26 detects that an image portion (as defined hereinabove) of a first horizontal scanning interval of a field of the video signal has begun, control signals are applied by the image interval detection circuit 26 to the multi-picture display horizontal and vertical direction counters 30 and 31 to enable counting operation by these counters to begin. The count values of the 30 and 31 are thereafter transferred, during each write cycle of the memory 7, to define successive addresses of the memory 7 (starting from row and column addresses $l_1$ and $k_1$) into which each image portion of the video signal is written. In addition, control signals are applied from the image interval detection circuit 26 to the R/W control signal generating circuit 33 to cause control signals to be applied from the R/W control signal generating circuit 33 to the S/P converter 4 and memory 7, whereby the image data are written into the successive addresses described above. This write-n operation is executed concurrently (i.e. in successively alternating read and write cycles) with the continuously executed read-out operation described above. Upon completion of write-in of the first image portion of this first scanning line (i.e. when row address $l_2$ of column address $k_2$ is reached), the image interval detection circuit 26 acts to halt counting operation by the multi-picture display horizontal direction counter 30. At the third horizontal sync signal pulse to occur thereafter, (i.e. when an output is produced from the ⅓ frequency divider 28) the column address is incremented by one, and the above process is repeated to write in the image data contained in the third scanning line of the field. Upon completion of writing in one field of the video signal into the memory region 42, the process is successively repeated for a plurality of fields, i.e. during a specific time duration of for example one or two seconds.

Since only one out of every three successive digital samples of each image portion of the video signal (from the A/D converter 3) is written into the memory region 42, and since the column address is incremented only once in every three successive horizontal sync signal pulses, it will be apparent that the display image contained in each field of the video signal will be stored in the memory region 42 in compressed form, i.e. as data representing an image compressed to ⅓ of the normal display image size. Since the contents of the memory 7 are being continuously read out during the above write-in operation, a miniature moving picture will appear in the region of the display screen corresponding to the memory region 42. This moving condition of the picture indicates to the user that the television channel corresponding to that display position (i.e. The upper left-side display region) is currently selected by the television signal receiving circuit 2.

Upon completion of the predetermined time interval for write-in to the memory region 42, a command is issued by the operation control circuit 12 for selection of another television channel by the television signal receiving circuit 2. The above process is then repeated to write image data for the newly selected channel into the next memory region, which in this embodiment is memory region 43, during the aforementioned predetermined time duration. A corresponding moving miniature display picture will now appear on the display, corresponding to region 43. In addition, a static miniature display picture (produced by read-out of the last field of the video signal which was written into the memory region 42) will appear in the display region corresponding to memory region 42.

This write-in operation during a predetermined time interval is sequentially executed thereafter for each of the remaining memory regions 44 to 50, and then again repeated from region 42, and so on.

In this way, during multi-picture display operation, a miniature display picture corresponding to the currently selected channel appears as a moving picture, while miniature display pictures corresponding to the other channels appear as static pictures, with each channel being sequentially selected during a fixed time interval which extends over a plurality of video signal fields.

To produce a continuous full-scale display of a picture of a desired channel, the user simply actuates the operating switch 11 (during an interval in which the miniature display picture for that channel appears as a moving picture), to thereby terminate multi-picture display mode operation and return to normal operation. The operation control circuit 12 then issues command signals whereby the channel currently selected by the television signal receiving circuit 2 is maintained continuously selected and the video signal output from the television signal receiving circuit 2 is transferred by switch 13 directly to the output terminal 14.

Figure 5:
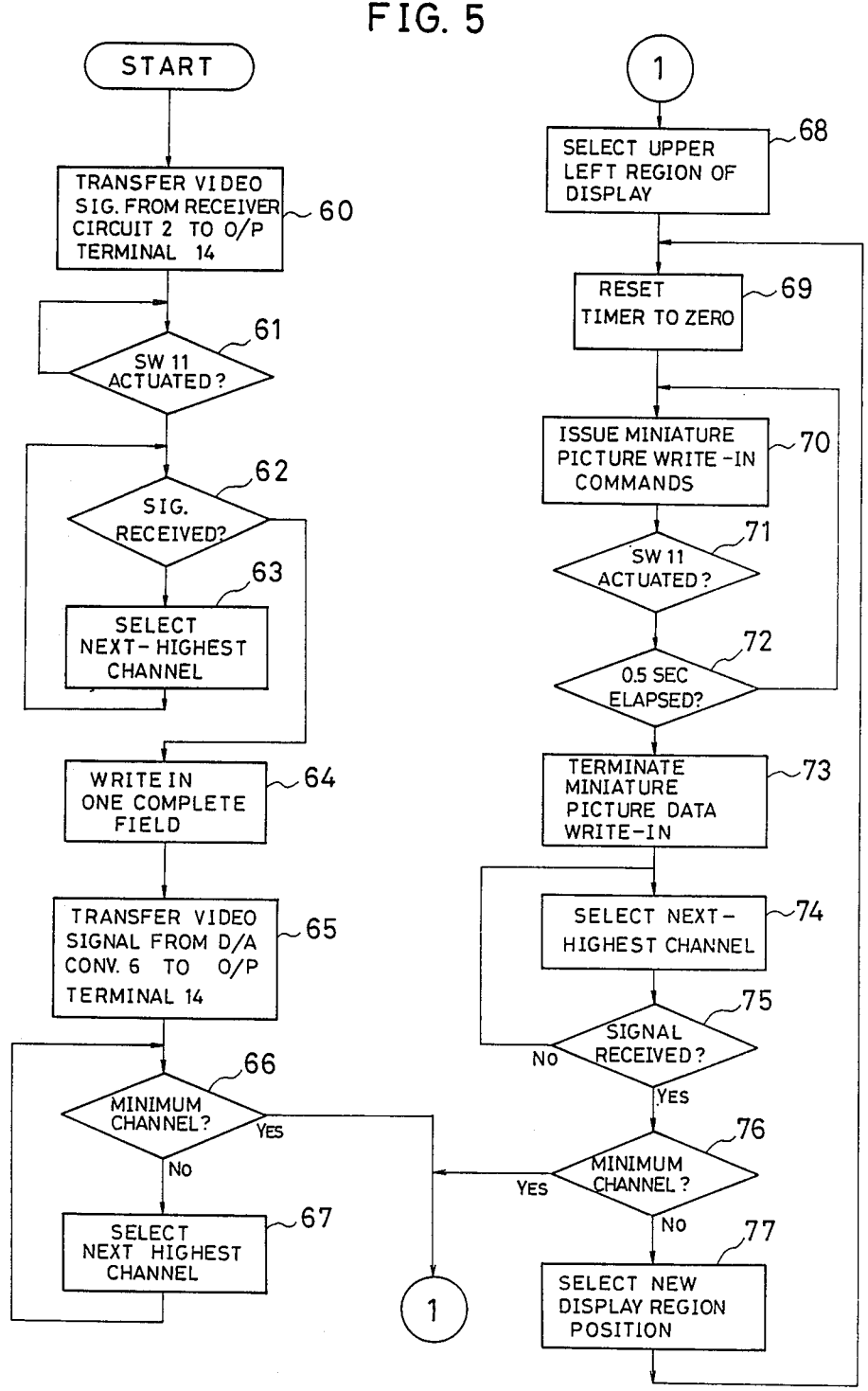
FIG. 5 is a flow chart for describing the operation of a microcomputer used for operation control in the embodiment of FIG. 1.

In the preferred embodiment, the operation control circuit 12 is implemented as a microcomputer, and the operating flow of this microcomputer which is executed with respect to write-in operations during the multi-picture display mode will be described referring to the flow chart of FIG. 5. When operation of the apparatus is started, a program step 60 is executed whereby the changeover switch 13 is set such as to transfer the video signal from the television signal receiving circuit 2 directly to the output terminal 14, to be displayed, i.e. the normal operating mode is established. If the operating switch 11 is actuated during this operating mode, then this is detected in a step 61, in which a decision is made as to whether or not the multi-picture display mode is to be initiated. If the operating switch 11 has been actuated, then execution moves to step 62 in which a decision is made as to whether or not a television signal is actually being received on the channel which is currently selected by the television signal receiving circuit 2. If it is judged that there is no signal being received on that channel, then a step 63 is executed, in which the next highest number of channel is selected, and operation then returns to step 62. If it is determined in step 62 that there is a television signal being received on the currently selected channel, then a step 64 is executed in which the initial stage of the multi-picture display mode described hereinabove is performed, whereby data of a single field of the video signal are written into the memory 7, including sync signal data. Upon completion of this initial stage, execution moves to step 65, in which the changeover switch 13 is set to transfer the output from the D/A converter 6 to the output terminal 14. In the next step, 66, a decision is made as to whether or not the currently selected television channel number is the lowest channel number. If it is not the lowest number, then the channel having the next highest number is selected in a step 67, and this process is repeated until the channel having the lowest number is selected. Execution then moves to step 68, in which the display region in which a first miniature display picture will be produced is established as the uppermost left side position (i.e. corresponding to memory region 42 of FIG. 4).

It should be noted that it would be possible to omit steps 66 and 67. However by executing these steps in conjunction with step 68, it is ensured that a miniature display picture corresponding to the lowest-numbered channel will always appear at a specific position on the display screen, so that the user can readily remember the relationships between display positions of the miniature pictures and the corresponding channel numbers.

Execution then moves to step 68, in which an internal timer of the microcomputer is reset to zero, and timing operation of that timer is initiated. A step 70 is then executed, in which a command is issued to start write-in of image data from the currently selected form (in compressed form, as described above) to the memory 7. Step 71 is then executed in which a decision is made as to whether or not the operating switch 11 has been actuated in order to terminate the multi-picture display mode. If the operating switch 11 has not been actuated, then execution moves to a step 72 in which a decision is made as to whether or not a predetermined time determined by the internal timer has elapsed, e.g. a time of 0.5 seconds, or one or two seconds, for example. If this time interval has not yet elapsed then execution returns to step 70. In this way, write-in of image data for the currently selected channel is continued during the predetermined time interval, which extends over a plurality of field intervals of the video signal.

If it is determined in step 72 that the predetermined time interval has elapsed, then command signals are generated to terminate the write-in operation, and execution moves to step 74 in which the selected channel number is incremented by one. Step 75 is then executed, in which a decision is made as to whether or not a television signal is actually being received on the currently selected channel, and if not, the selected channel number is again incremented in step 74. If it is found that a television signal is being received, the execution moves to step 76 in which a decision is made as to whether or not the number of the currently selected channel is the minimum channel number. If it is the minimum number, then execution moves to step 68 described hereinabove. If the channel number is not the minimum then execution moves to step 77 in which the display position for the miniature display picture is set in accordance with the number of the currently selected channel, i.e. in accordance with the one of memory regions 43 to 50 into which data are now to be written. In the preferred embodiment, these memory regions and the corresponding display regions are selected in the sequence 42, 43, 44, . . . 49, 50. However this is purely a matter of design choice.

The sequence of steps 69 to 73 are then successively repeated, to write image data for the currently selected channel into the next memory region and produce a corresponding miniature moving picture on the display, as a result of the memory read-out operations which are continuously performed during execution of the processing flow described above.

When a desired program appears on the display, in miniature moving picture form, the user can actuate the operating switch 11 to terminate the multi-picture display mode and retain the currently selected channel. This is detected in step 71, whereby execution moves to step 60 so that the output video signal from the television signal receiving circuit 2 is transferred directly to the output terminal 14 and hence to the display.

From the above description of the preferred embodiment, it can be understood that a television channel selection apparatus according to the present invention enables a user to rapidly and conveniently observe the contents of a plurality of television broadcast channels simultaneously, and to very easily select a desired channel, i.e. by performing a single switch actuation when it is observed that a miniature display picture corresponding to the desired channel is being displayed as a moving picture, while the miniature display pictures of all of the remaining channels appear as still pictures. Thus, such an apparatus will have widespread application to such video equipment as television receivers, VTRs, etc. in which a channel selection function is required.

What is claimed is:

1. In a channel selection apparatus manually operable for selecting one of a plurality of television channel signals to derive a video signal to be supplied to television picture display means having a display screen, the apparatus including television signal receiving circuit means coupled to receive said plurality of television channel signals for selecting and demodulating one of said channel signals to produce a first video signal, memory means capable of storing data representing at least one field of said first video signal, and control circuit means for controlling receiving circuit means and said memory means, operable to selectively establish a normal operating mode of said apparatus in which one of said channel signals is fixedly selected by said television signal receiving circuit means and said first video signal is directly transferred to said display means and a multi-picture display operating mode in which data stored in said memory means are continuously read out and converted to a second video signal which is transferred to said display means, the improvement whereby said control circuit means controls said receiving circuit means during said multi-picture display mode operation to sequentially select said plurality of television channel signals during respective time intervals of fixed duration, and controls said memory means during each of said time intervals such that data derived from said first video signal representing a television picture in compressed form are repetitively written into said memory means during a plurality of successive fields of said first video signal, said data being written concurrently with said continuous read-out operation, whereby a miniature display picture corresponding to a currently selected one of said channels is displayed by said display means in the form of a moving picture, while miniature display pictures corresponding to the remainder of said channels are displayed in the form of respective static pictures, and whereby said control circuit means executes control upon a transition from said multi-picture display mode to said normal operating mode such that one of said channel signals that is currently selected at the time of said transition is thereafter held continuously selected by said receiver circuit means.

2. A channel selection apparatus according to claim 1, in which said control circuit means comprises:

a manually actuatable operating switch;

an operation control circuit responsive to actuations of said operating switch for producing a plurality of command signals to selectively establish said normal operating mode and said multi-picture display operating mode;

sync separator means for deriving sync signals from said video signal produced from said television signal receiving circuit means; and memory control means operating in synchronism with said sync signals in response to said command signals and functioning immediately following a transition from said normal operating mode to said multi-picture display mode to execute write-in to said memory means of data representing substantially the entirely of a single field of said first video signal, and to thereafter, during each of said time intervals of fixed duration, detect portions of said video signal which contain only image information exclusive of sync signal information and execute write-in in compressed form of successive one of said video signal portions to said memory means.

3. A channel selection apparatus according to claim 2, in which said control circuit means controls said memory means such that data corresponding to said television channels are stored in respectively predetermined regions of said memory means, whereby said miniature display pictures corresponding to said channels are respectively positioned in specific predetermined regions on said display screen of said display means.

* * * * *